(12) United States Patent
Kudo (10) Patent No.: US 9,161,242 B2
(45) Date of Patent: Oct. 13, 2015

(54) RADIO COMMUNICATION SYSTEM AND RADIO COMMUNICATION METHOD

(75) Inventor: Shunsuke Kudo, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 95 days.

(21) Appl. No.: 13/881,657

(22) PCT Filed: Oct. 26, 2011

(86) PCT No.: PCT/JP2011/005985
§ 371 (c)(1),
(2), (4) Date: Apr. 25, 2013

(87) PCT Pub. No.: WO2012/056696
PCT Pub. Date: May 3, 2012

(65) Prior Publication Data
US 2013/0217382 A1    Aug. 22, 2013

(30) Foreign Application Priority Data
Oct. 27, 2010  (JP) .................................. 2010-241374

(51) Int. Cl.
H04W 24/00    (2009.01)
H04W 24/02    (2009.01)
H04W 24/04    (2009.01)
H04W 24/08    (2009.01)

(52) U.S. Cl.
CPC .............. *H04W 24/02* (2013.01); *H04W 24/04* (2013.01); *H04W 24/08* (2013.01)

(58) Field of Classification Search
None
See application file for complete search history.

(56) References Cited

U.S. PATENT DOCUMENTS

| 6,456,652 | B1 * | 9/2002 | Kim et al. ...................... 375/224 |
| 8,515,415 | B2 * | 8/2013 | Dimou et al. ................. 455/423 |
| 2001/0034228 | A1 * | 10/2001 | Lehtovirta et al. ............ 455/424 |
| 2005/0215201 | A1 * | 9/2005 | Cao et al. .................... 455/67.11 |
| 2006/0019651 | A1 | 1/2006 | Uchida et al. |
| 2008/0019279 | A1 * | 1/2008 | Kim et al. ...................... 370/241 |
| 2010/0165836 | A1 | 7/2010 | Wahlqvist et al. |
| 2011/0077010 | A1 * | 3/2011 | Xu et al. ....................... 455/437 |

FOREIGN PATENT DOCUMENTS

| JP | 10-276127 A | 10/1998 |
| JP | 2002-271833 A | 9/2002 |

(Continued)

OTHER PUBLICATIONS

International Search Report; PCT/JP2011/005985; Nov. 29, 2011.

*Primary Examiner* — Erika A Washington
(74) *Attorney, Agent, or Firm* — Studebaker & Brackett PC (57) ABSTRACT

A radio communication system (101) includes plural base stations (131) connected over a network and a mobile station (111), such that the mobile station (111) has a mobile station radio communication unit (115) and a control unit (117) that tests radio communication on each base station (131) that has transmitted a radio signal receivable by the radio communication unit (115) and controls the radio communication unit (115) to transmit silent failure information including identification information on a base station presumed to have silent failure from the test result; each base station (131) has a base station radio communication unit (135), a communication unit (137) that communicates with other base stations, and a base station control unit that controls the communication unit (137), when the identification information does not indicate the present base station, transmits the silent failure information and request for silent failure detection to the corresponding base station.

3 Claims, 5 Drawing Sheets

(56) References Cited

FOREIGN PATENT DOCUMENTS

| | | |
|---|---|---|
| JP | 2003-078938 A | 3/2003 |
| JP | 2006-060762 A | 3/2006 |
| JP | 2009-118196 A | 5/2009 |
| JP | 2010-532111 A | 9/2010 |

* cited by examiner

FIG. 2

RADIO COMMUNICATION SYSTEM AND RADIO COMMUNICATION METHOD

CROSS-REFERENCE TO RELATED APPLICATION

This application claims priority to and the benefit of Japanese Patent Application No. 2010-241374 filed Oct. 27, 2010, the entire contents of which are incorporated herein by reference.

TECHNICAL FIELD

The present invention relates to a radio communication system and a radio communication method.

BACKGROUND

In a radio communication system, events (failures) that block normal operation of the system sometimes occur, such as device malfunction or application related trouble. In order to achieve a stable radio communication system, the occurrence of a failure needs to be detected rapidly, and the system needs to be restored.

During data transfer, when a base station detects packet loss or transfer delay, which are caused by failure, the base station determines that communication is problematic. The base station then notifies a monitoring center (for example, an Element Management System (EMS)) of an alarm containing error information. The occurrence of a failure is detected via the alarm. If the very device that determines communication to be problematic has deteriorated or is malfunctioning, however, the monitoring center might not be notified of an alarm, despite the occurrence of a failure. If notification of an alarm is not provided, the occurrence of the failure is not detected. Such failure that is not detected upon occurrence is referred to as silent failure. Silent failure is discovered not via an alarm, but rather by circumstances such as degradation in performance, network delays or loss of communication, and greater effort and cost are required to recover from a silent failure than from a regular failure.

To address this problem, a method (for example, see Patent Literature 1) has been proposed whereby a mobile station, rather than a base station, actively transmits error information on communication problems to a monitoring center (management device). With this method, when a communication problem occurs, the mobile station accumulates error information (by time and place of occurrence and cause of the communication problem) in a storage device within the mobile station. Subsequently, when communication with the base station is successful, the mobile station transfers the accumulated error information to the management device via the base station. The management device uses the received error information to perform statistical processing by time, place and cause of the communication problem. The method in Patent Literature 1 thus allows the management device to identify a base station with a high probability of failure through statistical processing based on error information from the mobile station.

CITATION LIST

Patent Literature

PTL 1: JP2002-271833 (A)

SUMMARY

With the conventional method, however, as the number of base stations experiencing communication problems increases, the amount of error information handled by the management device for statistical processing also increases. This results in an increased processing load on the management device in order to determine the base stations for which the probability that silent failure has occurred is high.

Furthermore, the management device is not able to detect the presence or absence of silent failure, but the possibility of the occurrence of silent failure. Therefore, failure might not have actually occurred in a base station for which the probability that silent failure has occurred is determined to be high. In this case, the statistical processing by the management device is useless.

The present invention has been conceived in light of the above problems to provide a radio communication system and a radio communication method that, without placing a processing load on a management device, may identify a base station for which the probability that silent failure has occurred is high.

In order to solve the above problems, an aspect of the present invention is a radio communication system having a plurality of base stations connected with each other over a network and a mobile station performing radio communication with the plurality of base stations, the mobile station comprising: a mobile station radio communication unit; and a mobile station control unit configured to conduct a test of radio communication on each base station that has transmitted a radio signal receivable by the mobile station radio communication unit and, when silent failure is presumed to have occurred in a base station based on a result of the test, to control the mobile station radio communication unit to transmit silent failure information including identification information on the base station, each base station comprising: a base station radio communication unit; a communication unit configured to communicate with other base stations connected to the present base station over the network, and a base station control unit configured to cause the communication unit, when the identification information included in the silent failure information received by the base station radio communication unit does not indicate the present base station, to transmit the silent failure information and request information requesting performance of silent failure detection related to radio functions to the base station corresponding to the identification information.

The base station control unit preferably performs the silent failure detection when receiving, via the communication unit, the request information and silent failure information that includes identification information indicating the present base station.

The base station control unit preferably performs the silent failure detection and restarts the present base station upon detecting silent failure.

The communication unit is preferably connected to a management device over the network, and when receiving the silent failure information via the communication unit after the restart, the base station control unit preferably transmits the silent failure information to the management device via the communication unit.

The mobile station control unit preferably performs voice transmission with a base station a predetermined number of times in a predetermined interval as the test of radio communication and, when a success rate of the voice transmission does not satisfy a predetermined value, presumes that silent failure has occurred in the base station targeted for the voice transmission The mobile station control unit preferably performs data communication with a base station a predetermined number of times in a predetermined interval as the test of radio communication and, when a success rate of the data communication does not satisfy a predetermined value, presumes that silent failure has occurred in the base station targeted for the data communication.

While the object of the present invention has been described above in terms of devices, the present invention may also be achieved by a method or a program substantially equivalent to the above devices, or by a storage medium having such a program recorded thereon. These aspects are also to be understood as included in the scope of the present invention.

For example, another aspect is a radio communication method for a radio communication system having by a plurality of base stations connected with each other over a network and a mobile station performing radio communication with the plurality of base stations, the radio communication method comprising the steps of: the mobile station conducting a test of radio communication on each base station that has transmitted a receivable radio signal and, when silent failure is presumed to have occurred in a base station based on a result of the test, to transmit failure information including identification information on the base station; and the base station receiving the failure information and, when the identification information included in the failure information does not indicate the present base station, transmitting the failure information and request information requesting performance of silent failure detection related to radio functions to the base station corresponding to the identification information.

According to the radio communication system and radio communication method as described above, the occurrence of silent failure is predicted based on tests of radio communication performed by the mobile station, thus making it possible to identify a base station for which the probability that silent failure has occurred is high without placing a processing load on the management device.

BRIEF DESCRIPTION OF DRAWINGS

The present invention will be further described below with reference to the accompanying drawings, wherein.

DESCRIPTION OF EMBODIMENTS

An embodiment of the present invention will be described with reference to the accompanying drawings.

Figure 1:
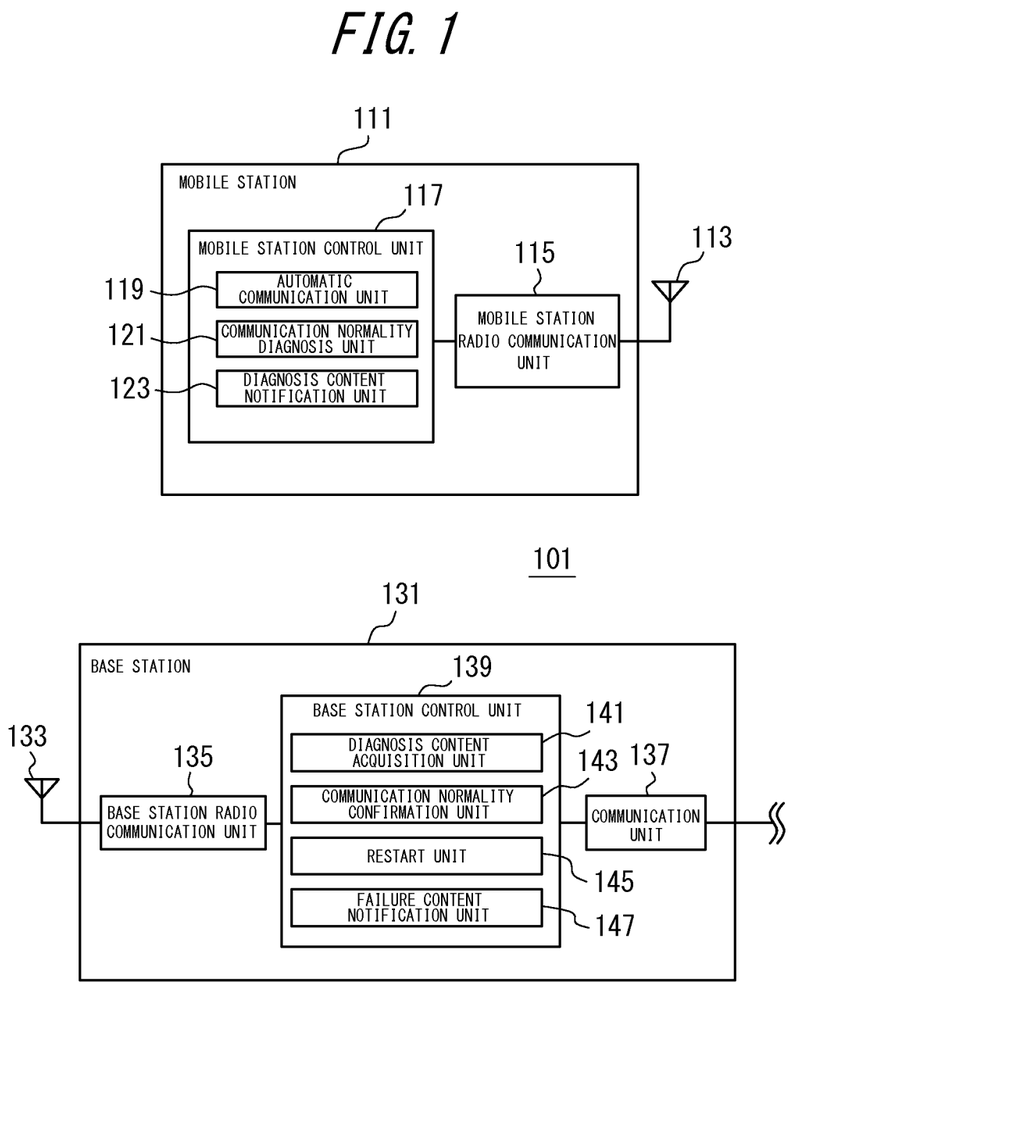
FIG. 1 is a functional block diagram schematically illustrating the structure of a radio communication system according to an embodiment of the present invention.

FIG. 1 is a functional block diagram schematically illustrating the structure of a radio communication system according to the embodiment of the present invention. A radio communication system 101 according to the embodiment of the present invention includes a mobile station 111 and a base station 131. The mobile station 111 is a radio communication terminal, such as in a cellular telephone or PHS. The base station 131 performs radio communication with the mobile station 111. The base station 131 is, for example, referred to as an evolved Node B (eNB) in the Long Term Evolution (LTE) system, and as an Access Network (AN) in the High Rate Packet Data (HRPD) system.

First, the functional block diagram of the mobile station 111 is described. The mobile station 111 includes a mobile station antenna 113, a mobile station radio communication unit 115 and a mobile station control unit 117. Via the mobile station antenna 113, the mobile station radio communication unit 115 transmits and receives radio signals to and from the base stations 131. The mobile station control unit 117 controls and manages the entire mobile station 111, starting with the functional blocks of the mobile station 111. The mobile station control unit 117 may be constituted by software running on any suitable processor, such as a central processing unit (CPU), or by dedicated processors specific to each process (such as digital signal processors (DSP)).

The mobile station control unit 117 according to the embodiment has an automatic communication unit 119, a communication normality diagnosis unit 121 and a diagnosis content notification unit 123.

The automatic communication unit 119 automatically and regularly attempts radio communication (a communication test) with each of the base stations 131 that has transmitted a receivable radio signal. Note that the automatic communication unit 119 may determine which base station has transmitted a receivable radio signal based on reception of pilot symbols or the like transmitted by the base station. As the communication test, the automatic communication unit 119 may, for example, conduct a voice transmission test or a data communication test. As the voice transmission test, the automatic communication unit 119 can, for example, transmit to a specific test number of the base station 131, receive voice data allocated to the number from the base station 131, and store the received voice data in a storage unit (not illustrated) in the mobile station 111. Here, the voice transmission test is successful if the voice data received by the automatic communication unit 119 is properly stored (this determination is performed by the communication normality diagnosis unit 121, described below). As the data communication test, the automatic communication unit 119 can, for example, access a specific server and download predetermined data. Here, the data communication test is successful if the data is downloaded properly (this determination is performed by the communication normality diagnosis unit 121, described below). The automatic communication unit 119 conducts the voice transmission test or the data communication test a predetermined number of times (for example, 10 times) in a predetermined interval (for example, one minute).

The communication normality diagnosis unit 121 determines whether the voice data or other data received from the base station 131 is properly stored in the storage unit in order to assess the result of the communication test conducted by the automatic communication unit 119. Based on the result of the communication test conducted by the automatic communication unit 119, the communication normality diagnosis unit 121 determines whether or not the communication state between the mobile station 111 and the base station 131 is normal. When, for example, the success rate of the voice transmission test or the data communication test does not satisfy a predetermined value, the communication normality diagnosis unit 121 determines that the probability is high that silent failure has occurred in the base station 131 targeted for the voice transmission or the data communication. The communication normality diagnosis unit 121 then presumes that silent failure has occurred in the base station 131. A success rate that does not satisfy the predetermined value refers to a success rate equal to or less than the predetermined value.

The diagnosis content notification unit 123 generates silent failure information based on the diagnosis result from the communication normality diagnosis unit 121 and transmits the silent failure information to the mobile station radio communication unit 115. In the silent failure information, the diagnosis content notification unit 123 includes information indicating that silent failure is presumed for a certain base station. The diagnosis content notification unit 123 also includes ID information ("identification information" in the claims) on the base station in the silent failure information. Associating the information on the presence or absence of silent failure with the ID information allows the base station receiving the silent failure information to determine to which base station the information on the presence or absence of silent failure corresponds. Furthermore, the diagnosis content notification unit 123 can include the specific failure content (for example, no transmission, no data communication) in the silent failure information.

Next, the functional block diagram of the base station 131 is described. Each base station 131 includes a base station antenna 133, a base station radio communication unit 135, a communication unit 137 and a base station control unit 139. Multiple base stations 131 may exist and connect with each other over a network through the communication unit 137. When base stations connect with each other, the communication unit 137 may be constituted by an X2 interface. The X2 interface is an interface between radio base stations as specified by the 3rd Generation Partnership Project (3GPP). The network connection between base stations with the X2 interface is established by wire and provides a stable communication environment as compared to the radio network connection between the mobile station and the base stations. Via the base station antenna 133, the base station radio communication unit 135 transmits and receives radio signals to and from the mobile station 111. Via the network, the communication unit 137 transmits and receives data to and from other base stations connected to the present base station. The communication unit 137 also connects the base station 131 to the management device (not illustrated in FIG. 1) and transmits and receives data to and from the management device. The management device manages the status of occurrence of silent failure in the base stations 131 and is, for example, an Element Management System (EMS). The data transmitted and received via the communication unit 137 is, for example, silent failure information or request information requesting performance of silent failure detection related to radio functions. The request information is transmitted to a base station, for which silent failure is presumed to have occurred, from another base station, which receives the silent failure information from the mobile station 111 via the base station radio communication unit 135 rather than via the communication unit 137. The base station control unit 139 controls and manages the entire base station 131, starting with the functional blocks of the base station 131. The base station control unit 139 may be constituted by software running on any suitable processor, such as a central processing unit (CPU), or by dedicated processors specific to each process (such as digital signal processors (DSP)).

The base station control unit 139 according to the embodiment has a diagnosis content acquisition unit 141, a communication normality confirmation unit 143, a restart unit 145 and a failure content notification unit 147. The diagnosis content acquisition unit 141 acquires information on the present base station from the request information and the silent failure information received by the base station radio communication unit 135 or the communication unit 137 and transmits the acquired information to the communication normality confirmation unit 143. The diagnosis content acquisition unit 141 also controls the communication unit 137 to transmit information not related to the present base station to the base station to which the information is related. The determination of whether the received information is related to the present base station is made based on the ID information included in the received information. When information related to a plurality of base stations is included in the received information, it is possible for a base station to extract the information related to itself based on the ID information. Upon receiving, via the communication unit 137, request information and silent failure information that includes the ID information of the present base station, the communication normality confirmation unit 143 performs the silent failure detection. The silent failure detection is performed by, for example, executing commands for verifying the normality of communication functions, the commands being stored in advance in a storage unit (not illustrated) of the base station 131. When the result of confirmation by the communication normality confirmation unit 143 indicates an error, the base station 131 restarts itself via the restart unit 145. When software is the cause of the silent failure, in some cases the silent failure is resolved by restarting the base station 131. After the restart, when the base station 131 again receives silent failure information that includes its own ID information from another base station via the communication unit 137, the failure content notification unit 147 determines that the silent failure was not resolved by restarting. The failure content notification unit 147 then transmits the silent failure information to the management device via the communication unit 137.

Figure 2:
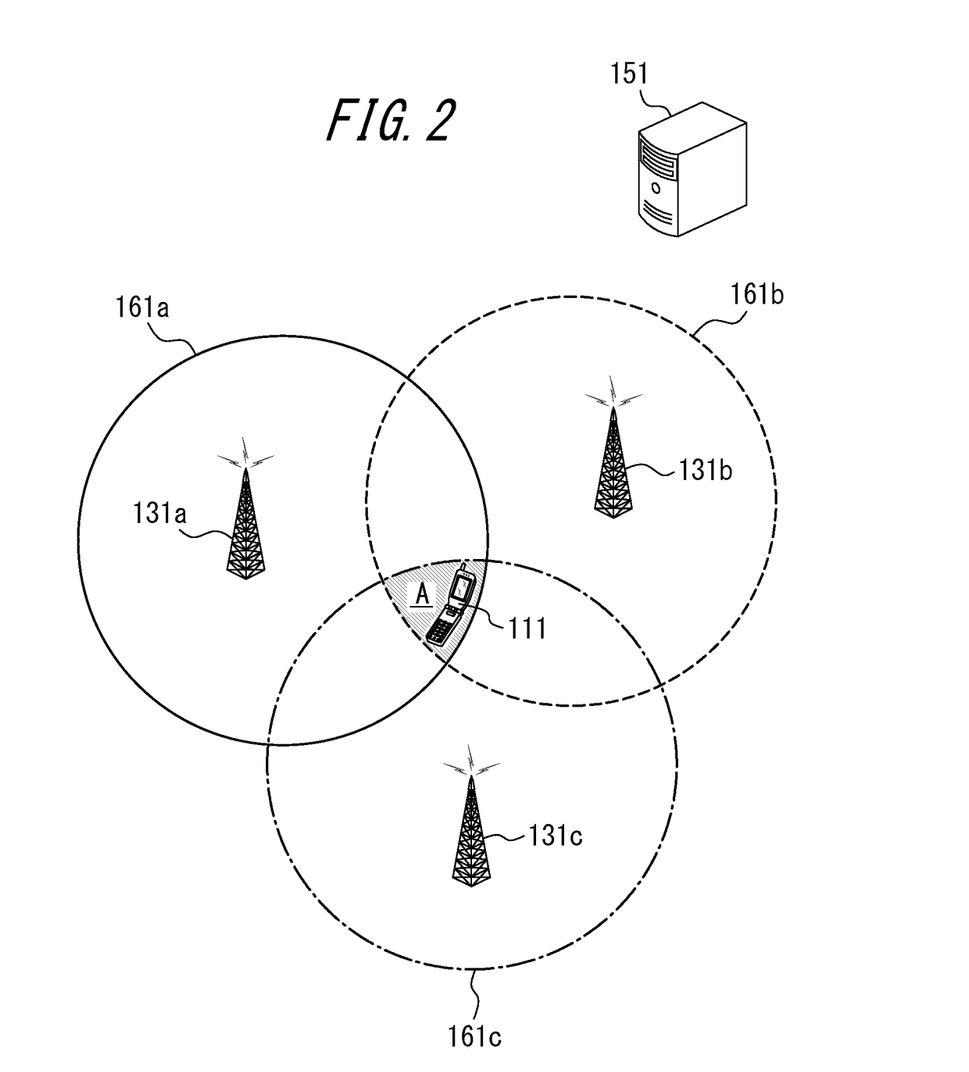
FIG. 2 illustrates the positional relationships between a mobile station, base stations and a management device according to the embodiment.
Figure 3:
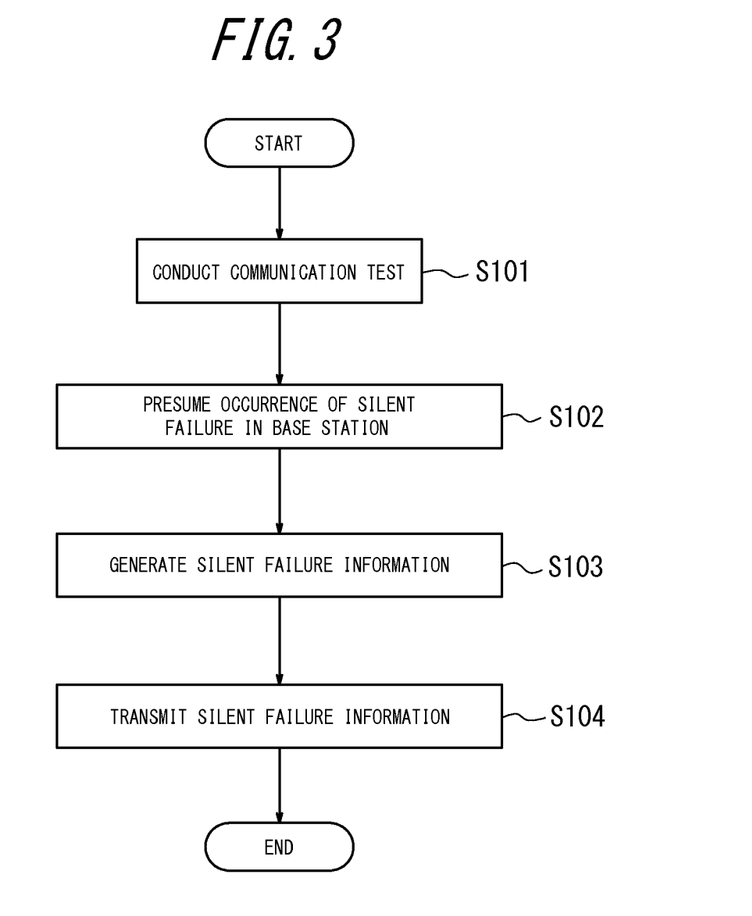
FIG. 3 is a flowchart illustrating a process by the mobile station according to the embodiment.
Figure 4:
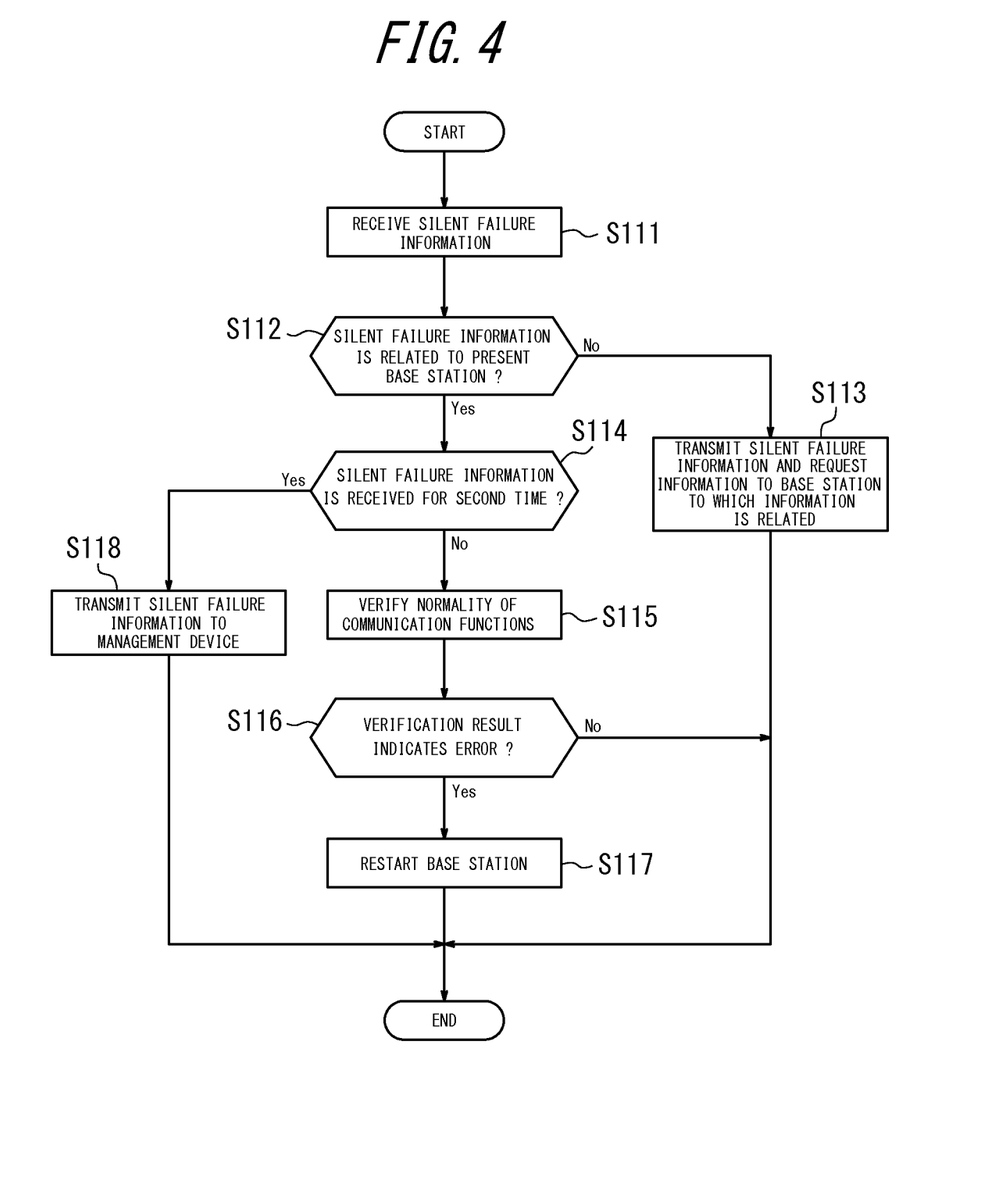
FIG. 4 is a flowchart illustrating a process by the base stations according to the embodiment.
Figure 5:
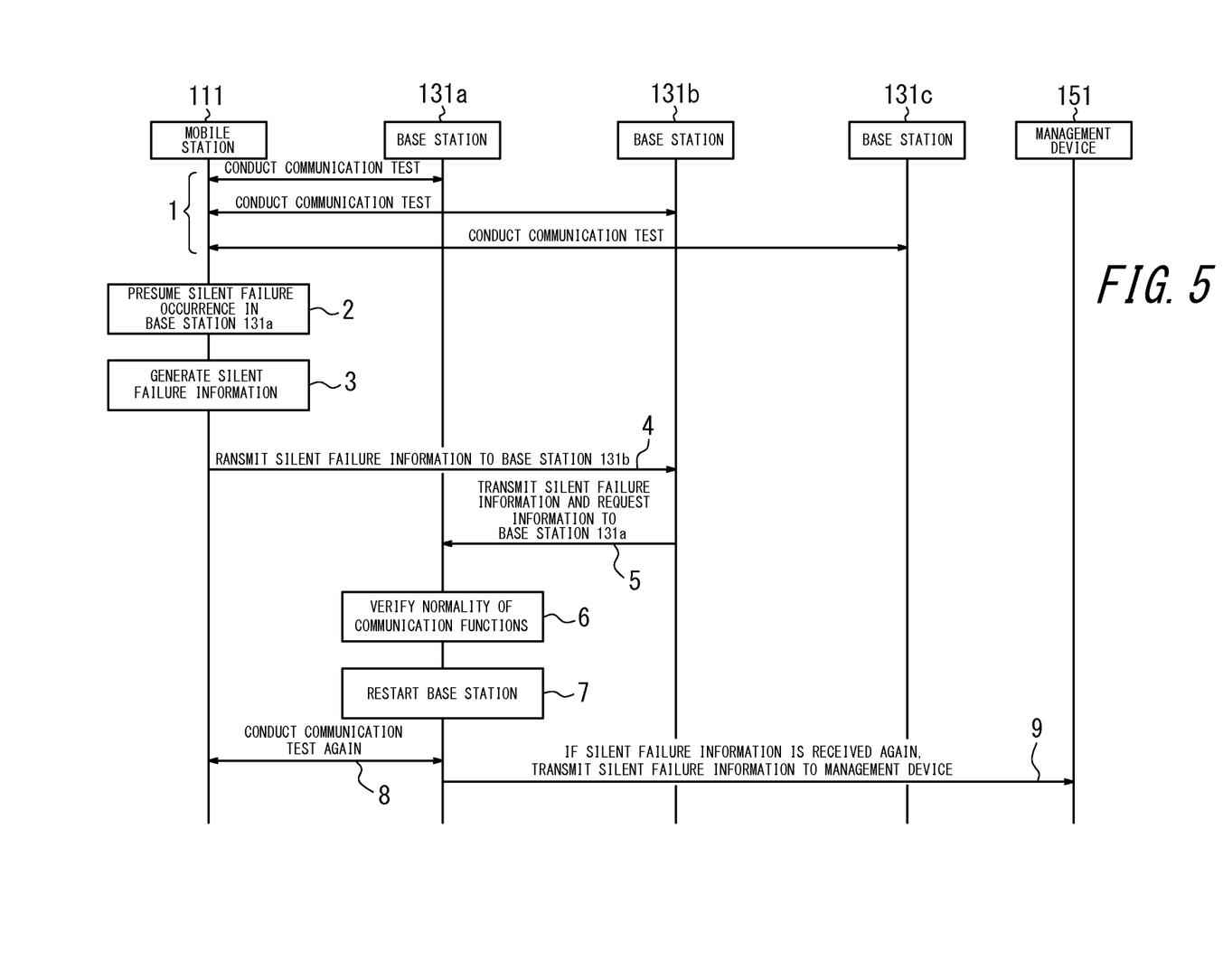
FIG. 5 illustrates a sequence diagram up to detection of silent failure of a base station according to the embodiment.

Next, a silent failure detection in the radio communication system 101 is described with reference to FIGS. 2, 3, 4, and 5. FIG. 2 illustrates the positional relationships between the mobile station, base stations and management device according to the embodiment. FIG. 3 is a flowchart illustrating a process by the mobile station according to the embodiment. FIG. 4 is a flowchart illustrating a process by the base stations according to the embodiment. FIG. 5 illustrates a sequence diagram up to detection of silent failure of a base station according to the embodiment.

Hereinafter, detection of silent failure in a base station is described for a situation in which the mobile station 111, three base stations 131*a*, 131*b* and 131*c* and a management device 151 are present, as illustrated in FIG. 2. Note that the functional blocks related to the base station 131*a*, the base station 131*b* and the base station 131*c* are respectively denoted by appending "a", "b" and "c" to the reference signs for the functional blocks of the base station 131 in FIG. 1. Furthermore, in the present embodiment, it is assumed that silent failure occurs in the base station 131*a*.

In FIG. 2, area 161*a* indicates a range (cell) reached by radio waves from the base station 131*a*. Area 161*b* indicates a range reached by radio waves from the base station 131*b*. Area 161*c* indicates a range reached by radio waves from the base station 131*c*. Near the cell border (cell edge), a plurality of cells overlap. This overlapping area is hereinafter referred to as a cell edge adjacent region. For example, in cell edge adjacent region A, the mobile station 111 receives a radio signal (radio waves) from the base stations 131*a-c*. Note that in areas 161*a-c*, the radio waves from the mobile station 111 to the base stations 131*a-c* are not guaranteed to arrive. Since the mobile station 111 has less transmission output than the base stations 131*a-c*, it may be the case that the mobile station 111 can receive radio signals from the base stations 131*a-c* yet cannot transmit radio signals to the base stations 131*a-c*.

In particular, in the cell edge adjacent region, the probability that the mobile station 111 cannot transmit radio signals to the base stations 131*a-c* is high.

First, with reference to the flowchart in FIG. 3, processing by the mobile station 111 is described. The automatic communication unit 119 conducts a communication test on the base stations 131*a-c* (step S101, and 1 in FIG. 5). As the communication test, the automatic communication unit 119 can, for example, perform either or both of a voice transmission test and a data communication test. In the present embodiment, it is assumed that the success rate for both the voice transmission test and the data communication test does not satisfy a predetermined value for the communication test on the base station 131*a*.

After the communication test, the communication normality diagnosis unit 121 presumes that silent failure has occurred in the base station (base station 131*a*) for which the success rate for both the voice transmission test and the data communication test does not satisfy the predetermined value (step S102, and 2 in FIG. 5). Note that alternatively, the communication normality diagnosis unit 121 may determine that silent failure has occurred in a base station for which the success rate for either the voice transmission test or the data communication test does not satisfy the predetermined value.

Next, the diagnosis content notification unit 123 generates silent failure information in which information indicating silent failure in the base station 131*a* is associated with the ID information of the base station 131*a* (step S103, and 3 in FIG. 5). Via the mobile station radio communication unit 115 and the mobile station antenna 113, the diagnosis content notification unit 123 then transmits the silent failure information to the base station determined, based on the communication test, to be in the best communication state (step S104, and 4 in FIG. 5). Hereinafter, the base station in the best communication state is assumed to be the base station 131*b*.

Next, with reference to the flowchart in FIG. 4, processing by the base stations 131 is described. Via the base station antenna 133*b*, the base station radio communication unit 135*b* in the base station 131*b* receives the silent failure information from the mobile station 111 (step S111). Based on the ID information, the diagnosis content acquisition unit 141*b* determines whether the silent failure information is related to the present base station (step S112). In the present embodiment, since the silent failure information is related to the base station 131*a* (step S112: No), the diagnosis content acquisition unit 141*b* transmits the silent failure information and request information requesting performance of silent failure detection to the base station 131*a* via the communication unit 137*b* (step S113, and 5 in FIG. 5).

Upon the communication unit 137*a* in the base station 131*a* receiving the silent failure information and the request information (step S111), the diagnosis content acquisition unit 141*a* determines whether the received information is related to the present base station (step S112). Since the received information is related to the base station 131*a* (step S112: Yes), the diagnosis content acquisition unit 141*a* determines whether the same silent failure information has been received in the past, i.e. whether the silent failure information is being received for the second time (step S114). The diagnosis content acquisition unit 141*a* can determine whether the silent failure information is being received for the second time based on whether the failure content included therein matches. Since the current silent failure information is received for the first time (step S114: No), the communication normality confirmation unit 143*a* executes commands for verifying the normality of communication functions, the commands being stored in advance in the storage unit of the base station 131*a* (step S115, and 6 in FIG. 5). When the result of verification indicates an error (step S116: Yes), the restart unit 145*a* determines that the communication functions of the base station 131*a* are not normal, and therefore that silent failure has occurred in the base station 131*a*. The restart unit 145*a* then restarts the base station 131*a* (step S117, and 7 in FIG. 5).

Since the automatic communication unit 119 in the mobile station 111 regularly conducts the communication test, the automatic communication unit 119 also conducts the communication test after the base station 131*a* restarts (step S101, and 8 in FIG. 5). When the success rate of the voice transmission and the data communication does not satisfy a predetermined value, the base station 131*a* again receives the silent failure information and the request information in steps S102-S104, S111 and S113 (step S112: Yes). This time, the silent failure information is being received for the second time (step S114: Yes), and therefore the failure content notification unit 147*a* transmits the silent failure information to the management device 151 (step S118, and 9 in FIG. 5). The management device 151 may thus manage the base stations in which an unresolved silent failure has occurred.

In the present embodiment, the mobile station control unit 117 in the mobile station 111 conducts a test (communication test) with each of the base stations 131*a-c* that has transmitted a radio signal receivable by the mobile station radio communication unit 115 and, when silent failure is presumed to have occurred in a base station based on the result of the test, controls the mobile station radio communication unit 115 to transmit silent failure information including identification information on the base station to the base station 131*b*. Since the ID information included in the silent failure information received by the base station radio communication unit 135*b* (the ID information indicating the base station 131*a*) does not indicate the base station 131*b*, the base station control unit 139*b* in the base station 131*b* controls the communication unit 137*b* to transmit the silent failure information and request information requesting performance of silent failure detection related to radio functions to the base station 131*a*, which corresponds to the identification information. In other words, a base station for which the probability that silent failure has occurred is high is identified by communication tests between the mobile station 111 and the base stations 131*a-c*, not requiring statistical processing by the management device 151. This approach therefore identifies a base station for which the probability that silent failure has occurred is high while reducing the processing load on the management device 151. Furthermore, if the mobile station 111 transmits the silent failure information related to the base station 131*a* to the base station 131*b*, which is in a good communication state, the information reaches the base station 131*a* over the inter-base station connection between the communication units 137*a* and 137*b* (X2 interface). The destination is determined by the ID information. That is, even if the mobile station 111 collectively transmits silent failure information related to a plurality of base stations, the information is sorted for distribution to the base stations at the receiving end. Accordingly, in order to notify a plurality of base stations of the occurrence of silent failure, the mobile station 111 does not need to send silent failure information directly to the base stations related to the information nor transmit silent failure information separately to each base station. The processing load on the mobile station 111 may therefore be reduced when silent failure occurs in a plurality of base stations.

In the present embodiment, when receiving request information and silent failure information that includes ID information indicating the present base station via the communication unit 137a, the base station control unit 139a performs the silent failure detection. By receiving the silent failure information, the base station 131a may therefore determine that the probability that silent failure has occurred in the base station 131a is high. Upon receiving the request information, the base station 131a begins verifying the normality of communication functions in order to confirm whether silent failure has indeed occurred. With this processing, the base station 131a may detect its own silent failure.

In the present embodiment, the base station control unit 139a performs the silent failure detection, and upon detection of silent failure, restarts the present base station. Some failures are resolved by restarting the base station (for example, failures caused by software).

In the present embodiment, the communication unit 137a is connected to the management device 151 over the network, and when the base station control unit 139a receives the silent failure information via the communication unit 137a again after restarting, the base station control unit 139a transmits the silent failure information to the management device 151 via the communication unit 137a. The management device 151 thus manages information on silent failures that have actually occurred in the base stations. Since the management device 151 does not identify a base station for which the probability that silent failure has occurred is high, the processing load on the management device 151 is reduced. Furthermore, the management device 151 may perform processing exclusively for analyzing the cause of silent failure that has occurred, thus making it possible to reduce the amount of time necessary for resolution of the silent failure.

In the present embodiment, the mobile station control unit 117 performs voice transmission with the base stations 131a-c a predetermined number of times in a predetermined interval as the test of radio communication (communication test) and, when the success rate of the voice transmission does not satisfy a predetermined value, presumes that silent failure has occurred in the base station 131a targeted for the voice transmission. The result of the communication test is thus determined based on the success or failure of each voice transmission. One possible method for determining the possibility of the occurrence of silent failure is to presume the occurrence of silent failure when, as compared to a past communication state, the number of differences is large (for example, received power value, number of lost packets, or transfer delay time) and the differences represent degradation in the communication state (such as a lower received power value, more lost packets, or a longer transfer delay time). As compared to this method, the method in the present embodiment represents a small processing burden by not requiring statistical processing based on a comparison between currently acquired data (on the success or failure of voice transmission) and past acquired data.

Furthermore, in the present embodiment, the mobile station control unit 117 performs data communication with the base stations 131a-c a predetermined number of times in a predetermined interval as the test of radio communication and, when the success rate of the data communication does not satisfy a predetermined value, presumes that silent failure has occurred in the base station 131a targeted for the data communication. By determining the possibility of the occurrence of silent failure taking into consideration not only the success rate of voice transmission but also of data communication, the mobile station 111 is more likely to identify a base station in which silent failure has occurred than when only taking voice communication into consideration.

Although the present invention has been described by way of an embodiment with reference to the accompanying drawings, it is to be noted that various changes and modifications will be apparent to those skilled in the art. Therefore, such changes and modifications are to be understood as included within the scope of the present invention.

For example, the functions and the like included in the various members, units, and steps may be reordered in any logically consistent way. Furthermore, units or steps may be combined into one or divided.

REFERENCE SIGNS LIST

101: Radio communication system
111: Mobile station
113: Mobile station antenna
115: Mobile station radio communication unit
117: Mobile station control unit
119: Automatic communication unit
121: Communication normality diagnosis unit
123: Diagnosis content notification unit
131, 131a, 131b, 131c: Base station
133: Base station antenna
135: Base station radio communication unit
137: Communication unit
139: Base station control unit
141: Diagnosis content acquisition unit
143: Communication normality confirmation unit
145: Restart unit
147: Failure content notification unit
151: Management device
161a, 161b, 161c: Area
A: Cell edge adjacent region

The invention claimed is:

1. A radio communication method for a radio communication system having a plurality of base stations connected with each other over a network, a mobile station performing radio communication with the plurality of base stations and a management device, the radio communication method comprising steps for:

the mobile station conducting a test of radio communication on each base station that has transmitted a receivable radio signal and, when silent failure is presumed to have occurred in a base station based on a result of the test, transmitting failure information including identification information on the base station;

a first base station receiving the failure information and, when the identification information included in the failure information does not indicate the present base station, transmitting the failure information and request information requesting performance of silent failure detection related to radio functions to the base station corresponding to the identification information; and a second base station, when receiving silent failure information including the identification information identifying the second base station and the request information, restarting the second base station, and, when receiving the silent failure information after the restart, transmitting the silent failure information to the management device.

2. A base station having a radio communication unit, the base station comprising:

a communication unit configured to communicate with other base stations and a management device over the network; and a base station control unit configured to control the communication unit, wherein the radio communication unit performs radio communication with a mobile station configured to transmit to a base station, when the base station is presumed to have a silent failure based on a test of radio communication on the base station, silent failure information including identification information of the base station, and the base station control unit restarts the present base station, when receiving via the communication unit, the silent failure information including the identification information indicating the present base station and request information requesting performance of silent failure detection, and, when receiving the silent failure information after the restart, transmits the silent failure information to the management device.

3. The base station of claim 2, wherein the base station control unit controls the communication unit such that, when the identification information included in the silent failure information received via the radio communication unit does not indicate the present base station, the communication unit transmits the silent failure information and the request information to a base station corresponding to the identification information.

* * * * *